United States Patent [19]

Linster

[11] Patent Number: 5,082,901
[45] Date of Patent: Jan. 21, 1992

[54] TIRE WITH TREAD

[75] Inventor: Tom D. Linster, Gilsdorf, Luxembourg

[73] Assignee: The Goodyear Tire & Rubber Company, Akron, Ohio

[21] Appl. No.: 587,128

[22] Filed: Sep. 24, 1990

[51] Int. Cl.$^5$ .................. C08L 7/00; C08L 9/00; C08L 9/06
[52] U.S. Cl. .................. 525/237; 152/209 R; 524/526
[58] Field of Search .................. 525/237; 152/209 R; 524/526

[56] References Cited

U.S. PATENT DOCUMENTS

| | | | |
|---|---|---|---|
| 4,843,120 | 6/1989 | Halasa et al. | 525/237 |
| 4,906,697 | 3/1990 | Kikuchi et al. | 525/237 |
| 4,929,679 | 8/1990 | Akita et al. | 525/237 |
| 4,946,887 | 8/1990 | Takino et al. | 525/237 |
| 4,963,615 | 10/1990 | Yuto | 535/237 |

Primary Examiner—Allan M. Lieberman
Attorney, Agent, or Firm—Henry C. Young, Jr.

[57] ABSTRACT

Pneumatic rubber tire with a rubber tread composition of styrene/butadiene copolymer rubber, cis 1,4-polyisoprene rubber and cis 1,4-polybutadiene rubber with a required glass transition temperature differentiation between the rubbers.

2 Claims, No Drawings

TIRE WITH TREAD

FIELD

This invention relates to a pneumatic rubber tire having a rubber tread of a specified rubber composition.

BACKGROUND

Pneumatic rubber tires are conventionally prepared with a rubber tread. Such tread is often composed of a blend of rubber.

In one aspect, the rubber composite for the tread may be designed to improve the rolling resistance of the tire without unduly sacrificing its traction (skid resistance) or treadwear. Such often desirable aspect is usually difficult to obtain with a single tread rubber compound because, for example, rolling resistance reduction is typically obtained at the expense of traction and/or treadwear.

Pneumatic rubber tires have been manufactured with treads composed of butadiene/styrene copolymer, natural rubber and cis 1,4-polybutadiene rubber for such purpose where the butadiene/styrene rubber contained about 20-25 percent styrene. For example, such tread might be composed of, based on 100 parts by weight of the rubber component, about 50 parts butadiene/styrene copolymer containing about 20-25 percent styrene, about 25 parts natural cis 1,4-polyisoprene and about 25 parts cis 1,4-polybutadiene.

DISCLOSURE AND PRACTICE OF THE INVENTION

In accordance with this invention, a pneumatic rubber tire is provided having a rubber tread where said tread rubber is comprised of, based on 100 parts by weight of the tread rubber, (1) about 40 to about 60 parts by weight styrene/butadiene copolymer rubber having a styrene content of about 30 to about 35 percent; (2) about 20 to about 30 parts by weight cis 1,4-polyisoprene rubber; and (3) about 20 to about 30 parts by weight cis 1,4-polybutadiene rubber; wherein the Tg of the said styrene/butadiene copolymer rubber is at least 30° C. higher than the Tg's of the said cis 1,4-polyisoprene rubber and the cis 1,4-polybutadiene rubber.

Preferably, the cis 1,4-polyisoprene rubber is natural rubber.

Typically, the butadiene/styrene copolymer rubber has a glass transition temperature (Tg) in the range of about −25° to about −50° C., the cis 1,4-polyisoprene rubber has a Tg in the range of about −65° to about −85° C. and the cis 1,4-polybutadiene rubber has a Tg in the range of about −75° to about −105° C.

The Tg represents the glass transition temperature of the respective rubbers in their uncured, uncompounded state. It can be determined by a differential scanning calorimeter at a rate of 1° C. per minute.

It is required that the Tg of the butadiene/styrene copolymer rubber is separated by at least 30° C. from the Tg of the cis 1,4-polyisoprene and cis 1,4-polybutadine rubber.

The importance of the rubbers being characterized so that their Tg's are clearly separated by a sizable magnitude is, it is believed, for one rubber to aid in providing good traction for the tread and another rubber to aid in providing good low temperature flexibility for the tread.

Utilization of the butadiene/styrene copolymer rubber with the higher level of styrene content (30-35 percent) is considered to aid in providing the tire with good wet surface traction, particularly as compared to a butadiene/styrene copolymer rubber with a lower (20-25 percent, or less) styrene content.

It is readily understood by those having skill in the art that the rubber compositions of the tread would be compounded with conventional compounding ingredients such as carbon black, silica, antidegradants, processing oil, stearate acid or a zinc stearate, zinc oxide, sulfur-providing materials and accelerators therefor.

Such compounding of rubber is well known to those having skill in such art. Antidegradants are typically of the amine or phenolic type while stearic acid is typically referred to as a rubber compounding ingredient, it may be pointed out that the ingredient itself is usually obtained and used as a mixture of organic acids primarily composed of stearic acid with at least one of oleic acid, linolenic acid and palmitolic and/or palmitic acid. The mixture may contain minor amounts (less than about six weight percent) of myristic acid, arachidic acid and/or arachidonic acid. Such material or mixture is conventionally referred to in the rubber compounding art as stearic acid.

Where normal or typical rubber compounding amounts or ranges of amounts of such additives are used, they are not otherwise considered as a part of the invention. For example, some of the ingredients might be classified, in one aspect, as processing aids. Such processing aids may be, for example, rubber processing oil such as paraffinic, napthenic and aromatic processing oils typically used in the range of about 2 to about 10 phr; waxes such as microcrystalline and paraffinic waxes typically used in a range of about 1-5 phr and often in a range of about 1 to about 3 phr; and resins, usually as tackifiers, such as, for example, synthetic hydrocarbon and natural resins typically used in a range of about 1-5 phr and often in a range of about 1 to about 3 phr. A curative might be classified as a combination of sulfur and sulfur cure accelerator(s) for the rubber compound (usually simply referred to as accelerator) or a sulfur donor/accelerator. In a sulfur and accelerator(s) curative, the amount of sulfur used is in a range of about 0.5 to 5 phr and usually in a range of about 0.5 to about 3 phr; and the accelerator(s), often of the sulfenamide type, is (are) used in a range of about 0.5 to about 3 phr and often in a range of about 1 to about 2 phr. The term "phr" refers to parts by weight of the referenced ingredient per one hundred parts by weight of rubber in the rubber composition. Such term is commonly used in the rubber compounding art.

After mixing, the compounded rubber can be fabricated into a tire tread and cured under conditions of heat and pressure by methods well-known to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

Mixtures of butadiene/styrene copolymer rubber having a Tg of about −40° C., cis 1,4-polyisoprene natural rubber and cis 1,4-polybutadiene rubber having Tg's of about −70° C. and about −105° C., respectively, were prepared comprised of the rubbers, carbon black and processing oil shown in Table 1 as Experiments A-D. The Tg of the butadiene/styrene copolymer was differentiated from the natural rubber by 30° C. and from the polybutadiene rubber by 60° C.

TABLE 1

| Material | Parts | | | |
|---|---|---|---|---|
| | Exp A | Exp B | Exp C | Exp D |
| Styrene/Butadiene Rubber[1] | 55 | 50 | 55 | 50 |
| Natural Rubber[2] | 25 | 30 | 30 | 25 |
| Cis 1,4-Polybutadiene[3] | 20 | 20 | 15 | 25 |
| Carbon Black | 80 | 80 | 75 | 80 |
| Processing Oil (Aromatic) | 45 | 50 | 45 | 50 |

[1]Styrene/Butadiene copolymer rubber containing about 35% styrene and a Tg of about −40° C.
[2]Natural rubber (cis 1,4-polyisoprene) having a Tg of about −70° C.
[3]Cis 1,4-polybutadiene rubber having a Tg of about −105° C.

1. Styrene/butadiene copolymer rubber containing about 35% styrene and a Tg of about −40° C. 2. Natural rubber (cis 1,4-polyisoprene) having a Tg of about −70° C. 3. Cis 1,4-polybutadiene rubber having a Tg of about −105° C.

The compounded rubber also contained conventional amounts of antidegradant of the paraphenylene diamine type, stearic acid, zinc oxide, sulfur and accelerator of the sulfenamide type.

EXAMPLE II

The prepared rubber compositions were cured at a temperature of about 150° C. for about 18 minutes and the resulting cured rubber samples evaluated for their physical properties as shown in the following Table 2. The experimental samples A-D correspond to the experimental samples A-D of Example I.

TABLE 2

| Properties | Ex. A | Ex. B | Ex. C | Ex. D |
|---|---|---|---|---|
| Tensile strength (KPa) | 18.6 | 16.9 | 18.8 | 17.4 |
| Modulus (300%) | 6.3 | 5.2 | 5.2 | 5.1 |
| Elongation (%) | 650 | 670 | 690 | 550 |
| Dynamic Modulus (−20° C.) | 47 | 56 | 46 | 55 |
| Dynamic Modulus (0° C.) | 29 | 32 | 25 | 32 |
| Tan Delta (0° C.) | 0.31 | 0.33 | 0.29 | 0.32 |
| Tan Delta (50° C.) | 0.26 | 0.29 | 0.28 | 0.28 |
| Tg | −40 & −33 | −50 & −34 | −54 & −33 | −53 & −36 |

Observation of the physical properties of the rubber composite demonstrate that rubber composites with dual Tg's give enhanced properties in wet traction and low temperature performance and rolling resistance.

The contribution of the higher styrene content for the butadiene/styrene copolymer rubber is considered to be important for wet traction for a tire tread.

Also, the contribution of the requirement that the Tg of the butadiene/styrene copolymer is at least 30° C. different from Tg's for the natural and polybutadiene rubbers is considered to be important for tire tread wet skid and performance.

EXAMPLE III

A pneumatic rubber tire was prepared having a rubber tread composed of the rubber composition of Experiment D. The tire was observed to have the following beneficial results: (A) good traction on wet roads; (B) good traction on snow and especially ice; and (C) good abrasion resistance and low rolling resistance.

Thus, the utilization of the butadiene/styrene rubber having sharply differing Tg's from those of the natural rubber and polybutadiene rubber by at least 30° C. for the tire tread is considered to be beneficial because it offers good tire performance over a wide range of tire service temperatures.

Further, the utilization of the higher styrene content for the butadiene/styrene copolymer rubber in the required rubber blend is to provide improvement of wet traction without appreciable loss of winter traction and rolling resistance.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a rubber tread where said tread rubber is comprised of, based on 100 parts by weight of the tread rubber, (1) about 40 to about 60 parts by weight styrene/butadiene copolymer rubber having a Tg in a range of about −25° C. to about −50° C. and a styrene content of about 30 to about 35 percent; (2) about 20 to about 30 parts by weight cis 1,4-polyisoprene rubber having a Tg in a range of about −65° C. to about −85° C.; and (3) about 20 to about 30 parts by weight cis 1,4-polybutadiene rubber having a Tg in a range of about −75° C. to about −105° C.; wherein the Tg of the said styrene/butadiene copolymer rubber is at least 30° C. higher than the Tg's of the said cis 1,4-polyisoprene rubber and cis 1,4-polybutadiene.

2. The tire of claim 1 where said cis 1,4-polyisoprene rubber is natural rubber.

* * * * *